(12) United States Patent
Boozer et al.

(10) Patent No.: US 11,192,075 B2
(45) Date of Patent: Dec. 7, 2021

(54) WHIPPING BLADE

(71) Applicant: Vita-Mix Management Corporation, Olmsted Township, OH (US)

(72) Inventors: Richard Boozer, Wakeman, OH (US); Stephen Hosey, North Olmsted, OH (US); Stephen Rukavina, Rocky River, OH (US); Corey Walker, Olmsted Falls, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 40 days.

(21) Appl. No.: 15/735,654

(22) PCT Filed: Jun. 15, 2016

(86) PCT No.: PCT/US2016/037593
§ 371 (c)(1),
(2) Date: Dec. 12, 2017

(87) PCT Pub. No.: WO2016/205345
PCT Pub. Date: Dec. 22, 2016

(65) Prior Publication Data
US 2018/0353918 A1   Dec. 13, 2018

Related U.S. Application Data

(60) Provisional application No. 62/175,781, filed on Jun. 15, 2015.

(51) Int. Cl.
*B01F 7/00* (2006.01)
*A47J 43/07* (2006.01)
(Continued)

(52) U.S. Cl.
CPC .......... *B01F 7/00458* (2013.01); *A47J 43/07* (2013.01); *A47J 43/10* (2013.01); *B01F 3/04453* (2013.01);
(Continued)

(58) Field of Classification Search
CPC .............. B01F 7/00458; B01F 7/00466; B01F 7/00475
(Continued)

(56) References Cited

U.S. PATENT DOCUMENTS

| 31,338 A | 2/1861 | Stevens |
| 88,478 A * | 3/1869 | Hermance ............. B01F 7/0045 366/316 |

(Continued)

FOREIGN PATENT DOCUMENTS

DE   202010014579   2/2011

OTHER PUBLICATIONS

Patent Cooperation Treaty (PCT), International Search Report and Written Opinion for Application PCT/US2016/037593 filed Jun. 15, 2016, dated Sep. 1, 2017, International Searching Authority, US.
(Continued)

*Primary Examiner* — David L Sorkin
(74) *Attorney, Agent, or Firm* — McDonald Hopkins LLC (57) ABSTRACT

A blade assembly for a blending system is shown and described. The blade assembly may include apertures formed through a body. The body may include paddles extending from the body. The blade assembly may be rotated to force a fluid through the apertures. The fluid may be frothed by the apertures.

18 Claims, 12 Drawing Sheets

(51) Int. Cl.
*A47J 43/10* (2006.01)
*B01F 3/04* (2006.01)

(52) U.S. Cl.
CPC ...... *B01F 7/00466* (2013.01); *B01F 7/00483* (2013.01); *B01F 2215/0006* (2013.01)

(58) Field of Classification Search
USPC .................................................. 366/316, 317
See application file for complete search history.

(56) References Cited

U.S. PATENT DOCUMENTS

| | | | | |
|---|---|---|---|---|
| 623,668 A * | 4/1899 | Holt | ................... | A47J 43/1025 366/252 |
| 2,984,462 A * | 5/1961 | O'Connor | ............ | A47J 43/0711 366/316 |
| 3,030,083 A * | 4/1962 | Stiffler | ................ | B01F 7/00475 366/316 |
| 3,606,577 A * | 9/1971 | Conn | .................. | B01F 7/00475 416/181 |
| 3,630,636 A * | 12/1971 | Hill | ..................... | B01F 7/00466 416/181 |
| 4,589,778 A * | 5/1986 | Mitchell | ............ | B01F 7/00458 366/316 |
| 4,813,787 A * | 3/1989 | Conn | .................. | B01F 7/00475 366/293 |
| 5,490,727 A | 2/1996 | Poschl | | |
| 6,012,492 A * | 1/2000 | Kozyuk | ................ | B01F 5/0661 138/37 |
| 7,316,502 B2 * | 1/2008 | Freeman | ............ | B01F 7/00041 366/316 |
| 2007/0171767 A1 | 7/2007 | Mao-Hsin | | |
| 2012/0300575 A1 | 11/2012 | Tsai | | |
| 2014/0061344 A1 | 3/2014 | Conti et al. | | |

OTHER PUBLICATIONS

Extended European Search Report for Application No. 16812318.0 dated Feb. 1, 2019, 13 pages.

* cited by examiner

WHIPPING BLADE

RELATED APPLICATIONS

This application is a 35 U.S.C. 371 national stage filing of PCT Application No. PCT/US2016/037593 filed Jun. 15, 2016 and entitled "WHIPPING BLADE," which claims the benefit of U.S. Provisional Patent Application Ser. No. 62/175,781, filed Jun. 15, 2015, and entitled "WHIPPING BLADE," the entirety of which are incorporated herein by reference.

TECHNICAL FIELD

The present disclosure relates to a blending system and more particularly, to a blending system having a whipping blade.

BACKGROUND

Coffee-based drinks are very popular and are commonly served with a frothed liquid. It is also popular to serve other drinks, such as tea-based drinks, or chocolate-based drinks with frothed liquids. Some popular options for frothed liquids may include milk, cream, skim milk, non-dairy creamers, and almond milk. Traditionally, frothed liquids are made at a café or restaurant by a machine, such as a cappuccino machine, where steam is passed through a liquid to create a frothy consistency. These machines are generally large, expensive, loud and difficult to maintain.

Some systems for creating froth use wire whisks. These systems can include hand-held whisks, mug or cup mixing systems, manual whisks, and powered whisks. Such systems often require multiple machines or tools to create froth and another drink which is mixed with the froth. The addition of multiple tools or machines may be cumbersome and may require additional clean-up. Wire whisks may be difficult to clean as foodstuff may get stuck or trapped in the wires. The wire whisks are also susceptible to physical deformation (e.g., bending, breaking, etc.), rusting, or other damage.

There is a need for improved frothing systems. More particularly, there is a need for blending systems that produce frothed liquids. There is also a need for blending systems that improve usability of for frothing.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A whipping blade assembly for a blending system is shown and described. The whipping blade assembly may include a body and a number of apertures formed through the body. Rotation of the body may cause a liquid to pass through the apertures and may froth the liquid. The body may include protrusions or areas at different elevations. The protrusions may draw the liquid through the apertures.

Another whipping blade assembly may include a body having a raised or convex portion. The convex portion may attach to a drive shaft of a blender, and may transition downwards to an area having apertures. The apertures may draw liquid therethrough so that the liquid is frothed.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

DETAILED DESCRIPTION

Reference will now be made in detail to exemplary embodiments, examples of which are illustrated in the accompanying drawings, wherein like numbered aspects refer to a common feature throughout. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Furthermore, as used herein, the words "coupled," "attached," "connect," and the like are utilized interchangeably unless contexts suggest otherwise. Such terms may mean removably or irremovably coupled. Furthermore, such terms may mean that articles or components may be or are capable of being coupled together. For instance, "G coupled with H" may mean that G is removably coupled with H, G is irremovably coupled with H, or G is capable of being coupled with H.

It is noted that the various embodiments described herein may include other components and/or functionality. It is further noted that while embodiments may refer to a blender or a blender system, various other systems may be utilized in view of the described embodiments. For example, embodiments may be utilized in food processor systems, spice grinder systems, coffee grinder systems, mixing systems, hand-held blending systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Moreover, blending or whipping of foodstuff or ingredients may result in a blended product. Such blended products may include sauces, salad dressings, creams, egg products (e.g., meringues), drinks, frozen drinks, smoothies, shakes, soups, purees, sorbets, or the like. It is noted that various other blended products may result from blending ingredients. Accordingly, terms such as "blended product" or "drink" may be used interchangeably unless context suggests otherwise or warrants a particular distinction among such terms. Further, such terms are not intended to limit possible blended products and should be viewed as examples of possible blended products. While blending of "ingredients," "contents" or "foodstuffs" is described, it is noted that non-foodstuff may be mixed or blended, such as paints, epoxies, construction material (e.g., mortar, cement, etc.), and the like.

It is noted that the blending systems may include any household blender and/or any type of commercial blending system, including those with covers that may encapsulate or partially encapsulate the blender. For instance, described embodiments may be utilized with a noise dampening cover or enclosure. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Blending systems do not froth or aerate a liquid, such as milk, to create a froth. In the past, frothing may have been done by hand with a wire whisk or with a device specifically designed for frothing, such as a powered, handheld wire whisk. Some of these devices use metallic whisks that have a wounded wire in a circular path. Such systems are often time-consuming, difficult to clean, easily damaged, and are overall cumbersome to use. Alternatively, frothing has been accomplished using steam such as in hot coffee related drinks. Devices that froth with steam are often load, expensive, and large. Such devices also heat the liquid. It, however, is often desired to include frothing in a cold (or not hot) drink such as a cold pressed-coffee drink. However, using a steamed froth mixed with the cold drink may result in a less than desirable drink.

Embodiments described herein relate to blender systems, and particularly, to blender systems utilizing a whipping blade assembly. The whipping blade may comprise a disk-shaped body. The body may include one or more apertures extending from a first side through a second side. Further, the body may include at least one paddle or protrusion that extends therefrom. A shaft attachment member may allow for the body to connect to a drive shaft that may rotate the body. In an aspect, a liquid may be forced through the apertures when the body is rotating. Forcing the liquid through the apertures may froth or aerate the liquid. The liquid may be forced through the apertures as the at least one paddle displaces liquid and draws liquid through the apertures.

In another aspect, the apertures may comprise rounded or non-sharp edges (e.g., dulled, not squared, filed, etc.). The rounded edges may improve the aeration of foodstuff, reduce frothing time, or the like. For example, the rounded edges may impart more air into a liquid in comparison to sharp or squared edges. It is noted that at least one embodiment may comprise apertures having at least one squared edge.

FIGS. 1A, 1B, 2A, 2B, and 3 illustrate various views of a whipping blade assembly 100. The whipping blade assembly 100 may comprise a body 102 having at least one aperture 110 that may whip or froth a liquid. It is noted that the apertures 110 may comprise any desired shape and configuration, such as generally cylindrical, funnel shaped, squared, or the like. It is further noted that whipping blade assembly 100 may comprise a other, additional, or a different number of apertures based on a desired design. Whipping blade assembly 100 may include other components not shown for readability or may be part of a larger system. For instance, whipping blade assembly 100 may be disposed within a blender container and may connect to a drive shaft of a motor of a blender base. In an aspect, the whipping blade assembly 100 may include shaft attachment member 104 that may operatively attach to at least a portion of a drive shaft. In at least one embodiment, a fastener, such as one or more threaded members (e.g., nuts, screws, bolts, etc.), may secure or fasten the whipping blade assembly 100 to a drive shaft of a motor (not shown).

Figure 1A:
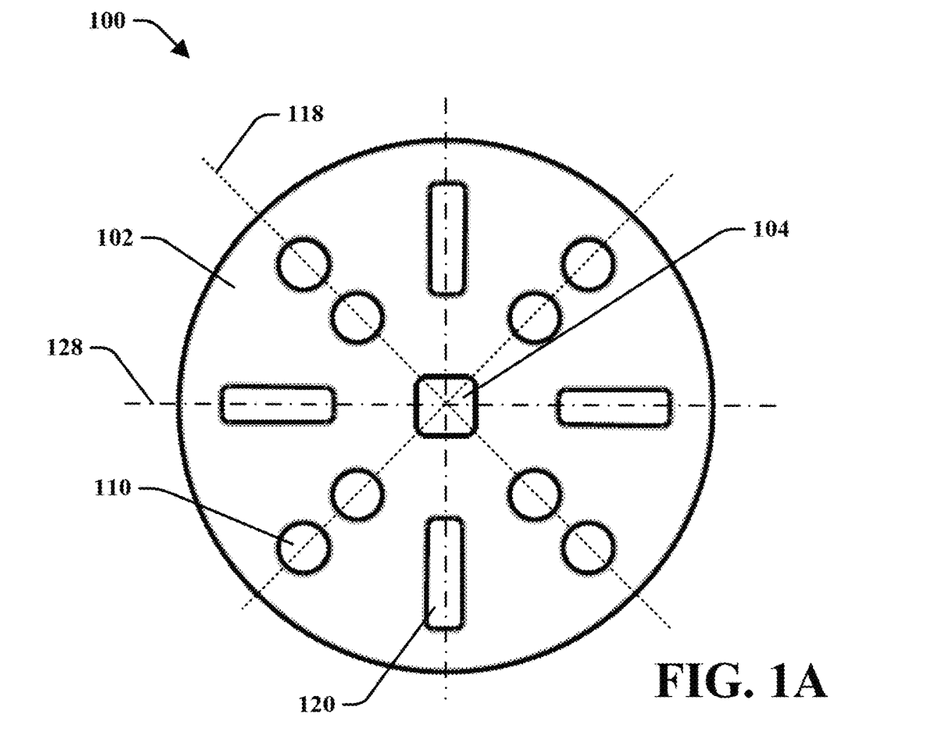
FIG. 1A is a top plane view of a whipping blade assembly, in accordance with various disclosed aspects.
Figure 1B:
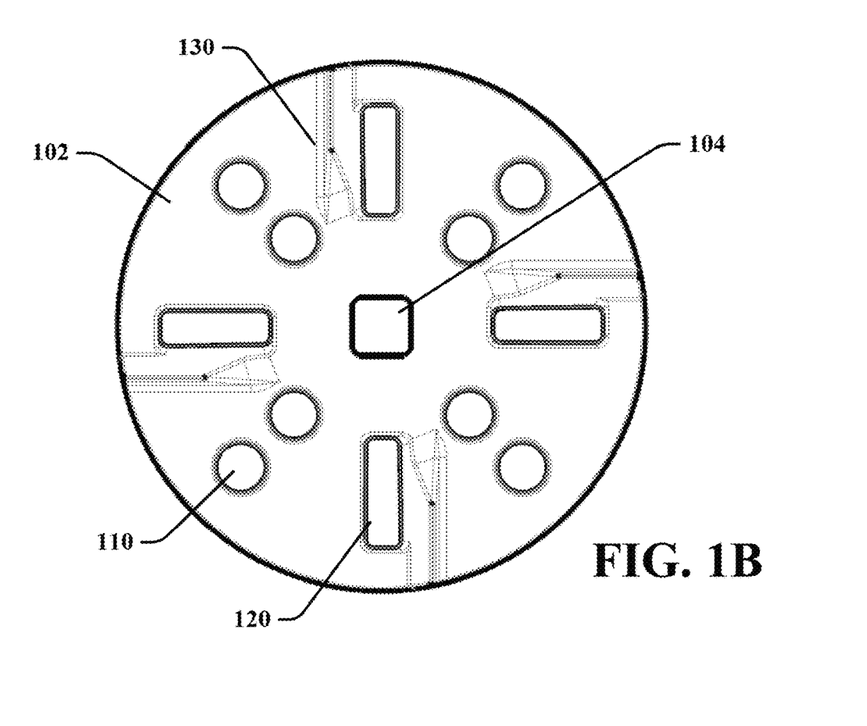
FIG. 1B is a bottom plane view of the whipping blade assembly, in accordance with various disclosed aspects.
Figure 2A:
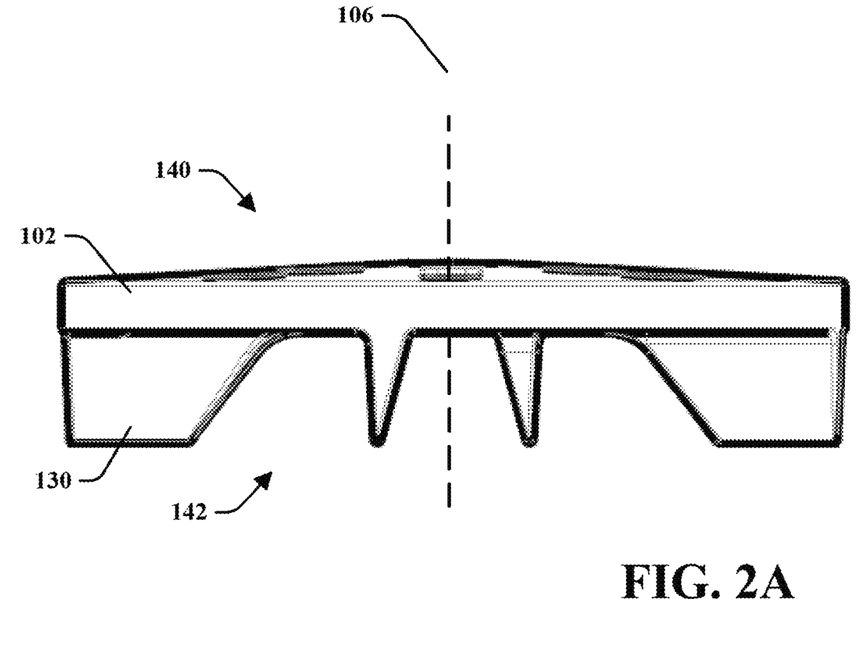
FIG. 2A is a perspective side view of the whipping blade assembly, in accordance with various disclosed aspects.
Figure 2B:
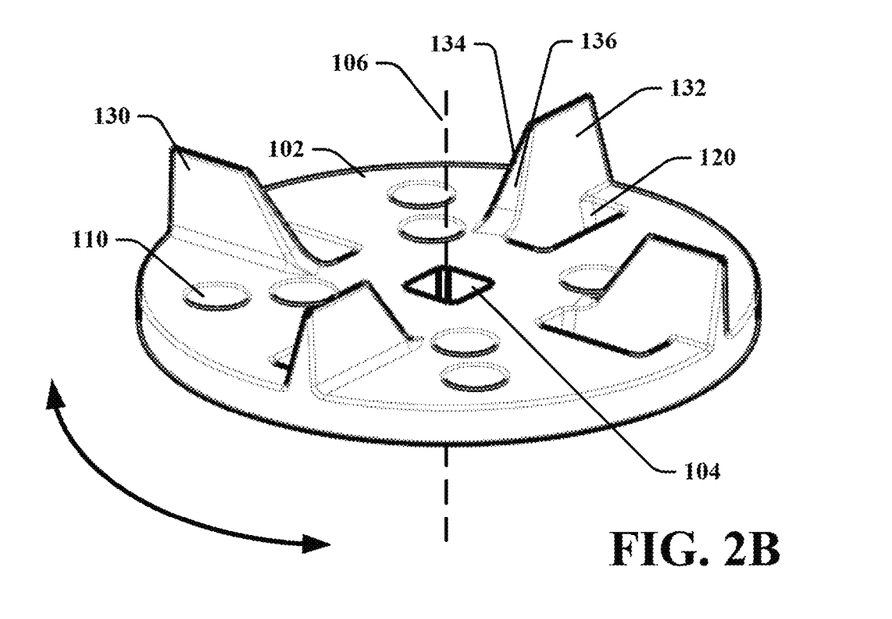
FIG. 2B is a perspective bottom view of the whipping blade assembly, in accordance with various disclosed aspects.

FIG. 1A is a top plane view of the whipping blade assembly 100, and FIG. 1B is a bottom plane view of the whipping blade assembly 100. As depicted, whipping blade assembly 100 may include at least one aperture 110, at least one elongated aperture 120, and at least one paddle member 130. FIG. 2A is a side view of the whipping blade assembly 100, and FIG. 2B is a perspective bottom view thereof.

In embodiments, whipping blade assembly 100 may comprise a first side 140 and a second side 142. In an aspect, descriptors of relative positions of first side 140 and second side 142 may be utilized based on desired orientations. For instance, first side 140 may be referred to as a top side and second side 142 may be referred to as a bottom side, it is noted that first side 140 may be a bottom side and second side 142 may be a top side.

In at least one embodiment, body 102 may comprise a generally disk-like shape. For instance, body 102 may represent a cross-section or slice of a cylindrical shape. It is noted that body 102 may comprise various other shapes or configurations, such as a cross-section of a conical shape, pyramid shape, an n-sided prism, where n is a number (e.g., a rectangular prism, triangular prism, pentagonal prism, etc.), or an irregular shape. In exemplary embodiments, body 102 may comprise at least one side that is convex or concave in shape, one or more wings (e.g., FIG. 8), or the like. It is noted that, the one or more surface of the body 102 may be generally smooth, roughed, whiffled or the like. As such, various described embodiments may comprise a different configuration and/or design of body 102.

Body 102 may comprise materials, such as plastic materials (e.g., including but not limited to, polymer material, polycarbonate, bisphenol-a (BPA) free plastics, food grade plastics, etc.), metals (e.g., stainless steel, aluminum, etc.), glass (e.g., thermal shock-resistant glass, etc.), or the like. According to embodiments, body 102 may be monolithically formed or formed of separate constructions attached to each other. For instance, body 102 may be monolithically formed via a molding process, a three-dimensional printing process, an etching process, or the like. The formation may form body 102 as a single piece or separate pieces that are attachable.

In another example, the body 102 may be formed of multiple pieces, such as a metal core that is overmolded with a plastic. The metal core may be disposed within the plastic to balance the whipping blade assembly 100 and/or add weight to the whipping blade assembly 100. In at least one embodiment, body 102 may comprise a plurality of separate members that are attached (e.g., removably or irremovably) to each other and/or a drive shaft.

Body 102 may comprise one or more apertures (e.g., apertures 110 and/or elongated apertures 120) formed therethrough. As depicted, apertures 110 may comprise a plurality of apertures extending from first side 140 to a second side 142 to fluidly connect an area above the first side 140 to an area below the second side 142. The apertures 110 may be generally cylindrical in shape such that the apertures 110 (e.g., side walls of apertures 110) are normal or perpendicular with at least one of the first side 140 or the second side 142. The apertures 110 and elongated apertures 120 may comprise side walls that are at least one of smooth, roughed, ribbed, whiffled, threaded, or the like. In another aspect, elongated apertures 120 may comprise generally elliptical or rectangular prism shapes.

It is noted that apertures 110 and elongated apertures 120 may comprise other shapes, such as prisms, conical shapes, irregular in shape, or the like. It is further noted that apertures 110 may be configured such that their side walls are at an angle (e.g., are not normal or perpendicular) with at least one of first side 140 or second side 142. According to at least one embodiment, diameters or perimeters of the apertures 110 and 120 may alter in size from a first distance from first side 140 to a second distance from first side 140. For instance, apertures 110 may have a smaller diameter proximal to first side 140 and may have a larger diameter proximal to second side 142.

It is noted that various embodiments may comprise a different number of apertures 110 and/or elongated apertures 120 arranged in various configurations. For instance, body 102 may comprise apertures 110 and/or elongated apertures 120 formed in line with a center of body 102, or shaft attachment member 104, offset from shaft attachment member 104, or the like. For example, FIG. 1A depicts apertures 110 formed in line with shaft attachment member 104 in a general plus or "X-shape". Reference line 118 is drawn to illustrate the X-shape. In another aspect, elongated apertures 120 are in a general X-shape configuration such that any one of the elongated apertures 120 is in line with at least one other elongated aperture and/or shaft attachment member 104. Reference lines 128 depict the general X-shape configuration of elongated apertures 120. In embodiments, the X-shape may allow for increased flow, reduced vortex formation, or the like.

Figure 3:
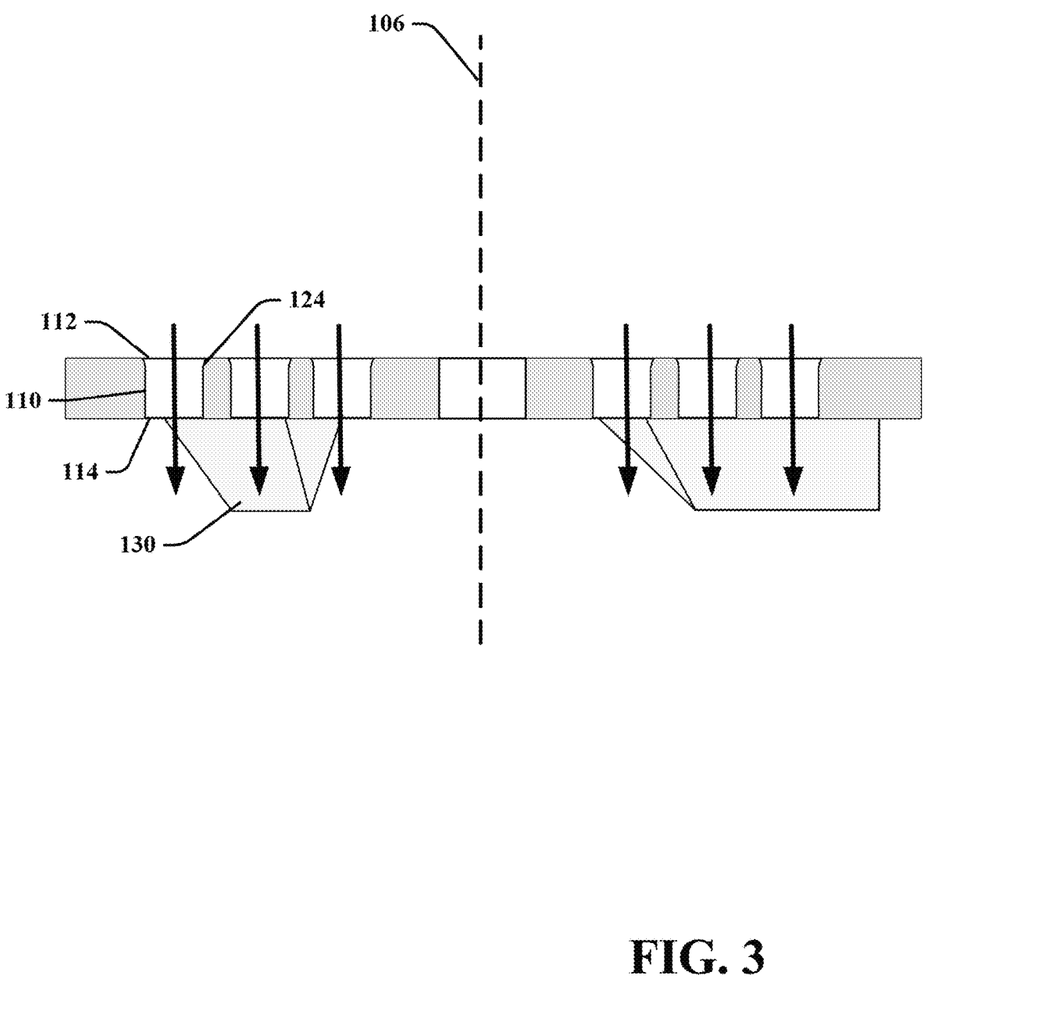
FIG. 3 is a partial cross-sectional view of the whipping blade assembly, in accordance with various disclosed aspects.

As depicted, apertures 110 and elongated apertures 120 may extend through body 102 from first side 140 to second side 142. This may allow fluid to pass through the apertures, such as during a blending or frothing process. For instance, FIG. 3 depicts a partial, cross-sectional view of whipping blade assembly 100. During a blending process, a fluid (e.g., milk) may be drawn through the apertures 110 as the whipping blade assembly 100 rotates about axis 106. The fluid may pass through the apertures proximal to first edge 112 and may exit the aperture 110 proximal to bottom edge 114. In an aspect, paddles 130 may displace a fluid below the body 102 which may create a vacuum or pump-like effect that draws a fluid from above body 102 to below body 102. As the fluid passes through the apertures 110, portions of the fluid may contact first edge 112 and/or second edge 114. The edges 112 and 114 may impart air in the fluid to form a froth or aerated liquid.

In embodiments, at least one of the first edge 112 or second edge 114 may comprise a rounded or non-sharp portion. Thus, while FIG. 3 depicts edge 112 as comprising rounded or tapered portions 124, various embodiments may include other or different tapered portions. The tapered portions 124 may comprise at least a portion of an edge that is rounded, shaved, or otherwise non-sharp or not squared. In an aspect, the tapered portions 124 may allow for increased aeration, an increased rate or aeration, decreased time needed to aerate, and/or improve flow through the apertures 110. In some embodiments, one of the first edge 112 or second edge 114 may comprise the tapered portions 124 while the other edge comprises a sharp portion. It is noted that one or more of apertures 110 and/or elongated apertures 120 may comprise tapered portions 124 while other apertures do not comprise a tapered portion. For example, embodiments may include apertures 110 that may comprise one tapered portion, two taper portions, no tapered portions, or any combination thereof. It is noted that elongated apertures 120 may also have tapered portions.

In at least one embodiment, body 102 may comprise differently shaped and/or sized apertures 110 and/or elongated apertures 120. For instance, body 102 may comprise cylindrical, conical, prism, or other shaped apertures. In another example, the apertures may comprise differently sized perimeters and/or different volumetric measurements.

Paddles 130 may comprise protrusions extending from second side 142 of body 102. The paddles 130 may comprise various shapes or dimensions. In an example, the paddles 130 may be generally wedge-shaped wherein a thickness of the paddles 130 decreases from proximal the body 102 to a distal end of the paddles 130. In another aspect, the paddles 130 may comprise a first wall 132 that is perpendicular to the body 102 and a second wall 134 that is not perpendicular (e.g., at an angle other than about 90 degrees). As depicted, assembly 100 may include paddles 130 that may comprise generally rectangular prism-like shapes with a portion removed. For instance, paddles 130 may comprise a portion 136 relieved of material or tapered towards the axis 106. The shape and dimensions of the paddles 130 may be selected to direct flow of material. As such, any desired shape and/or dimensions may be utilized for paddles 130. While paddles 130 are shown as extending from one side, it is noted that paddles 130 may extend from multiple sides, such as first side 140 and second side 142.

In at least one embodiment, paddles 130 may protrude from body 102 in a position proximal to elongated apertures 120. In an aspect, a side wall of an elongated aperture 120 may share a wall with or transition to form wall 132 of a paddle 130. It is noted that other apertures (e.g., apertures 110) may be proximal to paddles 130 such that walls of the apertures transition to form wall 132 or 134. It is further noted, however, that paddles 130 may be disposed such that they do not share walls with apertures.

As described herein, the paddles 130 may extend from second side 142. Second side 142 may face towards a blender motor or blender base when attached to a drive shaft. In other embodiments, the paddles 130 may face in other directions. In another aspect, the whipping blade assembly 100 may be driven by the drive shaft to rotate about axis 106. It is noted that the blade assembly 100 may be rotated clockwise or counter clockwise. In one aspect, the whipping blade assembly 100 is rotated based on the configuration of paddle 130, such that the fluid dynamics or physical dimensions/shapes of the whipping blade assembly 100 cause a liquid to be drawn through at least one aperture when the whipping blade assembly 100 is rotated.

In an example, a user may desire to froth milk for a drink. Traditionally, the user would have to expend a large amount of time and energy to whisk the liquid by hand. Other options include powered wire whiskers, steamers, or the like. These methods and systems were complex, cumbersome and costly. To improve on or solve these shortcomings, the user may utilize a whipping blade assembly as disclosed herein (e.g., whipping blade assembly 100). The whipping blade assembly 100 may be utilized by a blender (e.g., single serving blender, pitcher-like blender, etc.) or other device (e.g., immersion blender, manual frothing device, specialized frothing device, etc.). The user may pour milk in the container for whipping with the whipping blade assembly 100 may be driven by the blender. The whipping blade assembly 100 may quickly produce (in comparison with other systems) frothed milk at a desired consistency. In another aspect, the user may easily clean the whipping blade assembly 100 and may even place the whipping blade assembly 100 in a dishwasher without worrying about damaging the whipping blade assembly 100.

Figure 4:
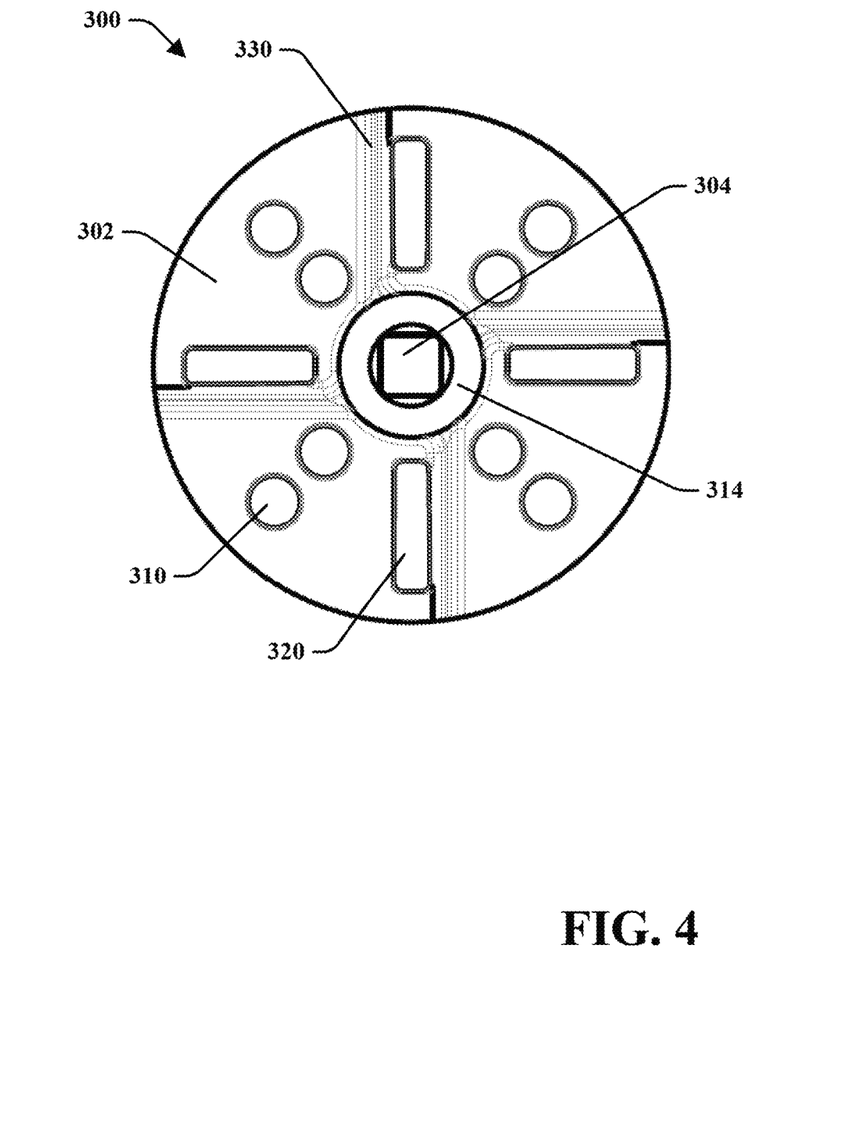
FIG. 4 is a bottom plane view of a whipping blade assembly with a shaft support, in accordance with various disclosed aspects.
Figure 5A:
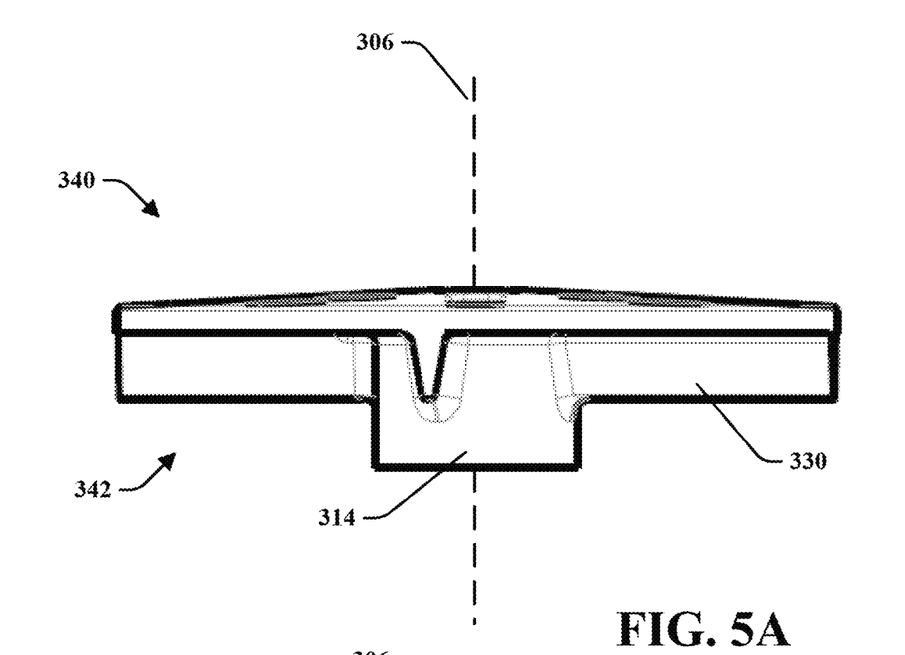
FIG. 5A is a side perspective view of the whipping blade assembly with the shaft support, in accordance with various disclosed aspects.
Figure 5B:
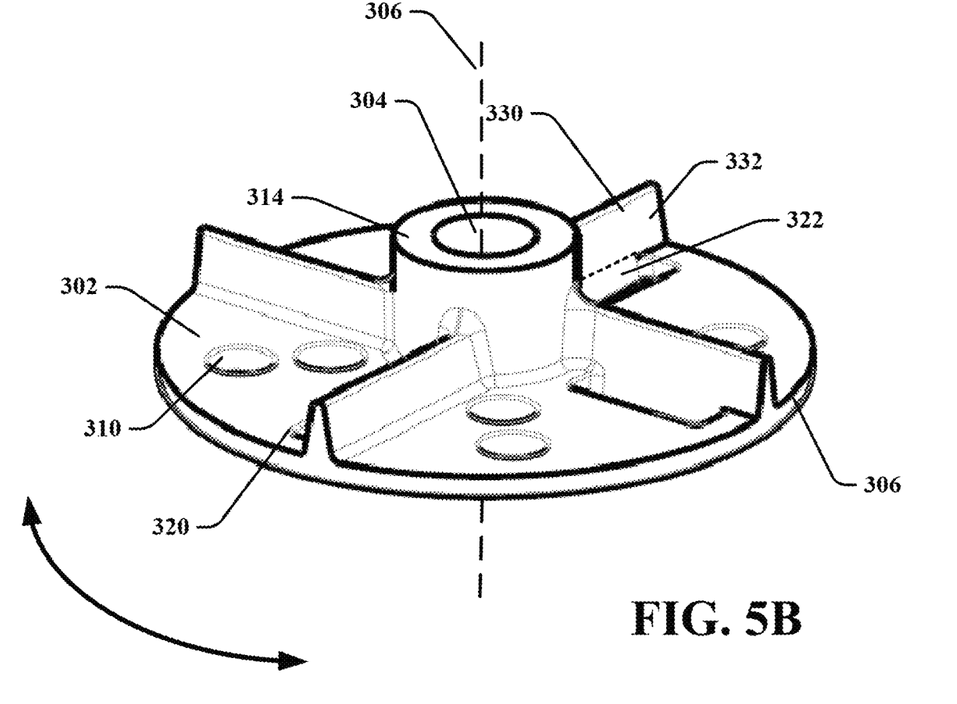
FIG. 5B is a bottom perspective view of the whipping blade assembly with the shaft support, in accordance with various disclosed aspects.

FIGS. 4, 5A, and 5B illustrate views of whipping blade assembly 300 in accordance with various described aspects. Whipping blade assembly 300 may primarily include a body 302, apertures 310, elongated apertures 320, paddles 330, shaft attachment member 304 and receiver support 314. It is noted that whipping blade assembly 300 may comprise various shapes and configurations. In an aspect, like-named components of the various embodiments may comprise similar features or functionality unless context suggests otherwise. For instance, body 302 and body 102 may comprise similar materials, shapes, and dimensions. In another aspect, apertures 310 and elongated apertures 320 may comprise similar shapes and configurations as those of whipping blade assembly 100. It is noted that the apertures 310 and elongated apertures 320 may comprise different shapes, a different number of apertures, different arrangements, or the like.

In an embodiment, body 302 may comprise receiver support 314 extending therefrom. The receiver support 314 may extend from a second side 342 towards a blender base when operatively attached to a blender system. In one aspect, the receiver support 314 may receive a drive shaft or an attachment member that is configured to secure whipping blade assembly 300 to the drive shaft. In another aspect, the receiver support 314 may contact a portion of a blender container or retainer nut to raise the paddles 330 a distance above a bottom of the blender container or retainer nut. As such, the size of the support 314 may be selected based on the shape of a container, drive shaft, or the like.

Paddles 330 may extend from a perimeter 306 of body 302 to the receiver support 314. Aperture wall 322 may seamlessly transition to wall 332 of paddle 330. It is noted that walls of other apertures (e.g., apertures 310) may transition to walls of paddles. In another embodiment, paddles 330 may be offset from apertures such that the aperture walls and walls of the paddles 330 are displaced from each other.

FIGS. 6A, 6B, 7A, and 7B illustrate views of whipping blade assembly 500 in accordance with various described aspects. Whipping blade assembly 500 may primarily include a body 502, apertures 510, elongated apertures 520, paddles 330, shaft attachment members 504 and receiver support 514. As described herein, whipping blade assembly 500 may comprise various shapes, configurations, materials and constructions. In an aspect, like-named components of the various embodiments may comprise similar features or functionality unless context suggests otherwise. For instance, body 502 and body 102 may comprise similar materials, shapes, and dimensions. In another aspect, apertures 510 and elongated apertures 520 may comprise similar shapes and configurations as those of whipping blade assembly 100 and/or 300.

Figure 6A:
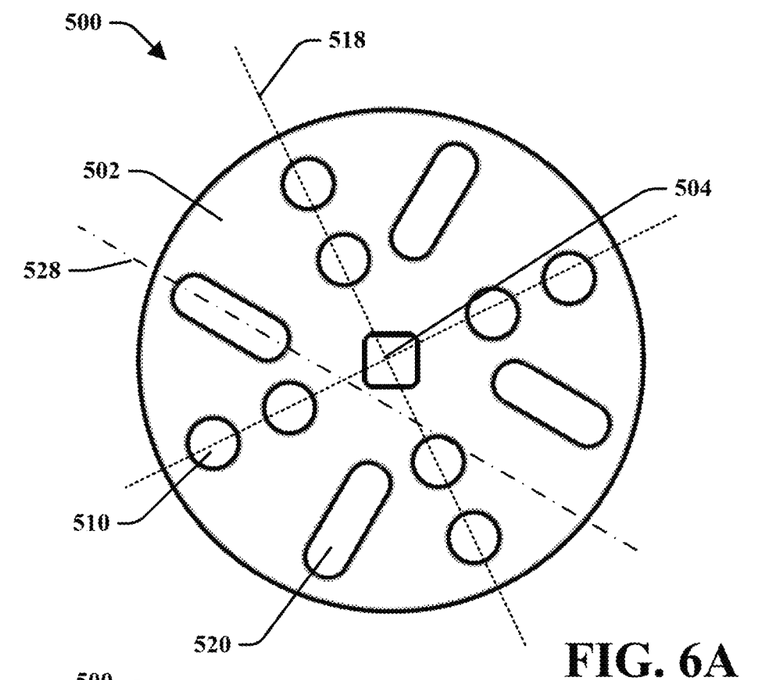
FIG. 6A is a top plane view of a whipping blade assembly with offset apertures, in accordance with various disclosed aspects.
Figure 6B:
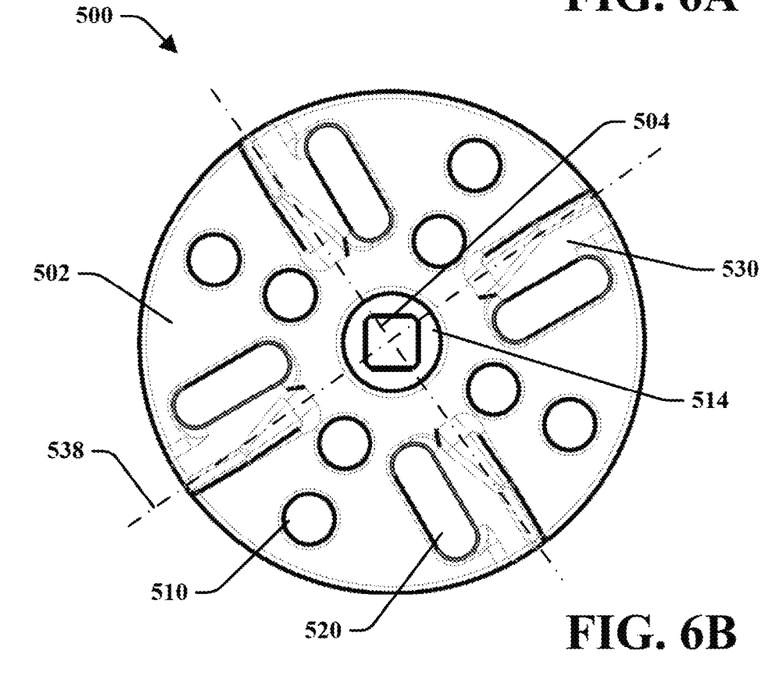
FIG. 6B is a bottom plane view of the whipping blade assembly with offset apertures, in accordance with various disclosed aspects.
Figure 7A:
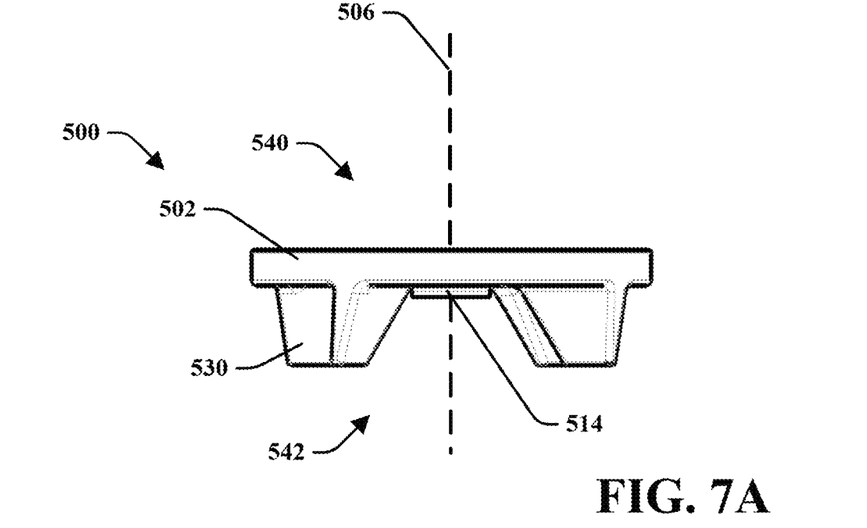
FIG. 7A is a side view of the whipping blade assembly with offset apertures, in accordance with various disclosed aspects.
Figure 7B:
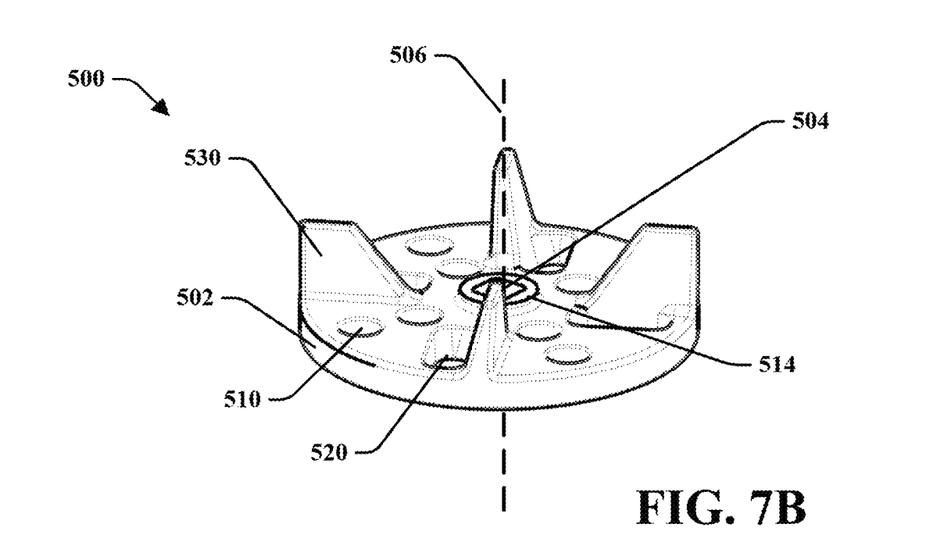
FIG. 7B is a bottom perspective view of the whipping blade assembly with offset apertures, in accordance with various disclosed aspects.

As illustrated in FIG. 6A, reference lines 518 depict the "X-shape" orientation of apertures 510. It is noted that elongated apertures 528 are arranged such that they are out of line with a central point, e.g., axis 506. In an aspect, paddles 530 are in line with axis 506 and in an "X-shape" configuration as illustrated by reference lines 538 in FIG. 6B. It is noted that the apertures 510, elongated apertures 520 and paddles 530 may comprise other configurations or orientations. It is further noted that whipping blade assembly 500 may comprise a different number of apertures 510, elongated apertures 520 or paddles 530.

In at least one embodiment, whipping blade assembly 500 may include shaft attachment members 504 and the receiver support 514. Receiver support 514 may extend from body 502. In an aspect, the receiver support 514 may extend towards a blender base or bottom of a container when attached to a blender system. It is noted that the receiver support 514 may extend a distance from body 502 that is shorter or smaller than the distance which the paddles 130 extend from the body 502.

Figure 8:
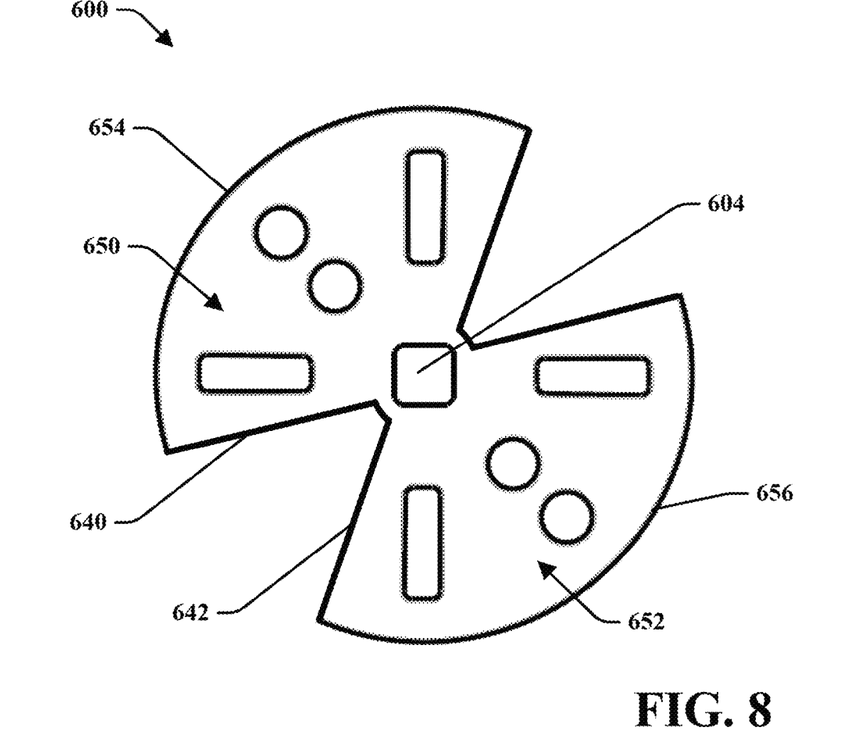
FIG. 8 is a top plan view of a whipping blade assembly with a plurality of wings, in accordance with various disclosed aspects.

FIG. 8 is a top plane view of a whipping blade assembly 600 in accordance with various described aspects. Whipping blade assembly 600 may include a plurality of wings, such as first wing 650 and second wing 652. The wings 650 and 652 may include apertures, paddles, and other features as described with reference to the disclosed embodiments.

It is further noted that wings 650 and 652 may generally extend from proximal a central point or a shaft attachment member 604 towards distal ends 654 and 656 of the wings 650 and 652. In an embodiment, the wings 650 and 652 may generally increase in width from shaft attachment member 604 to the distal ends 654 and 656. It is noted that whipping blade assembly 600 may comprise a different number of wings, differently arranged apertures, or the like.

In another aspect, whipping blade assembly 600 may include a leading edge 640 and a trailing edge 642. The whipping blade assembly 600 may be rotated counter-clockwise relative to FIG. 8. The leading edge 640 and/or trailing edge 642 may be tapered, rounded, or the like. It is noted that the one or more of edges 640/642 may be squared. Rounding and/or squaring of the edges may allow for fluid to flow about whipping blade assembly 600 during operation and/or may alter (e.g., reduce) times needed to whip an ingredient.

Figure 9:
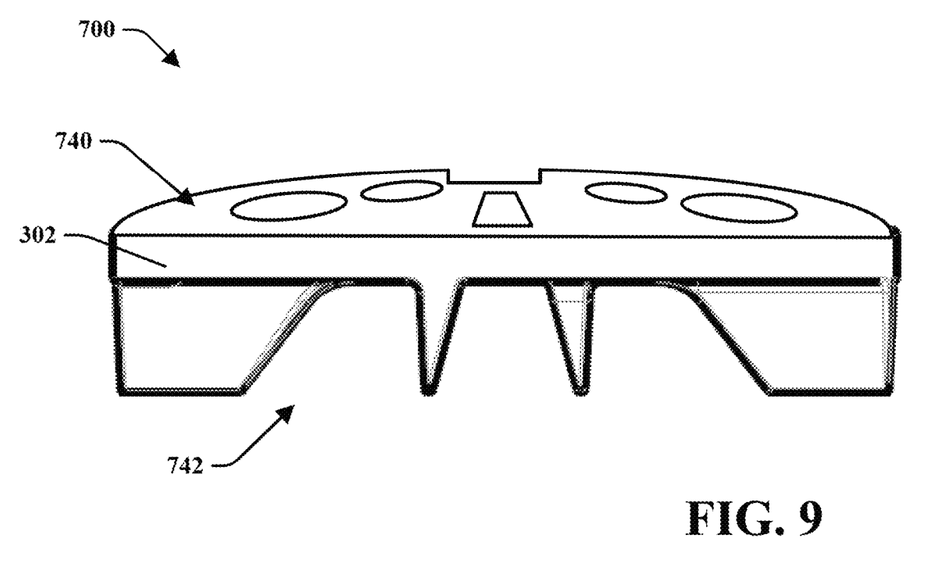
FIG. 9 is a side view of a whipping blade assembly with a curved surface, in accordance with various disclosed aspects.
Figure 10A:
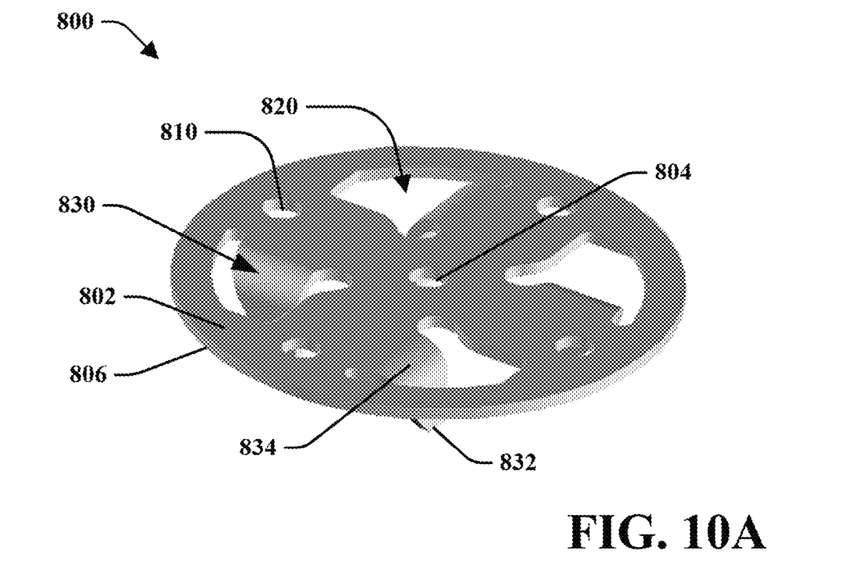
FIG. 10A is a perspective side view of a whipping blade assembly, in accordance with various disclosed aspects.
Figure 10B:
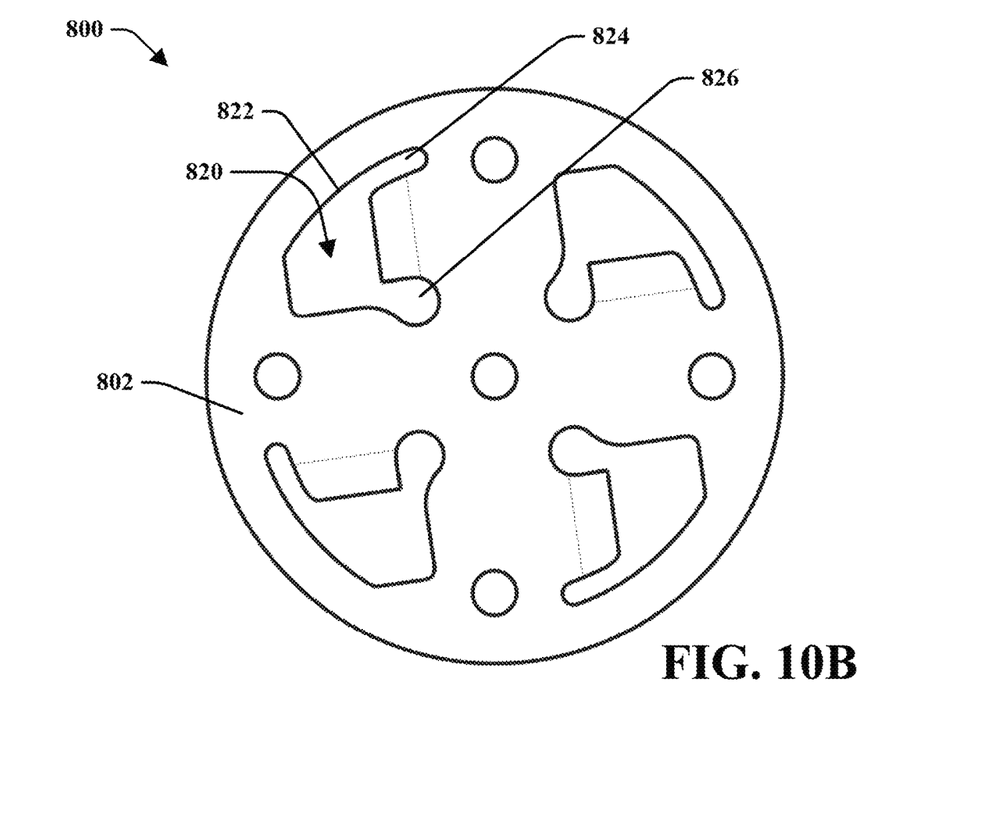
FIG. 10B is a top plane view of the whipping blade assembly of FIG. 10A, in accordance with various disclosed aspects.
Figure 10C:
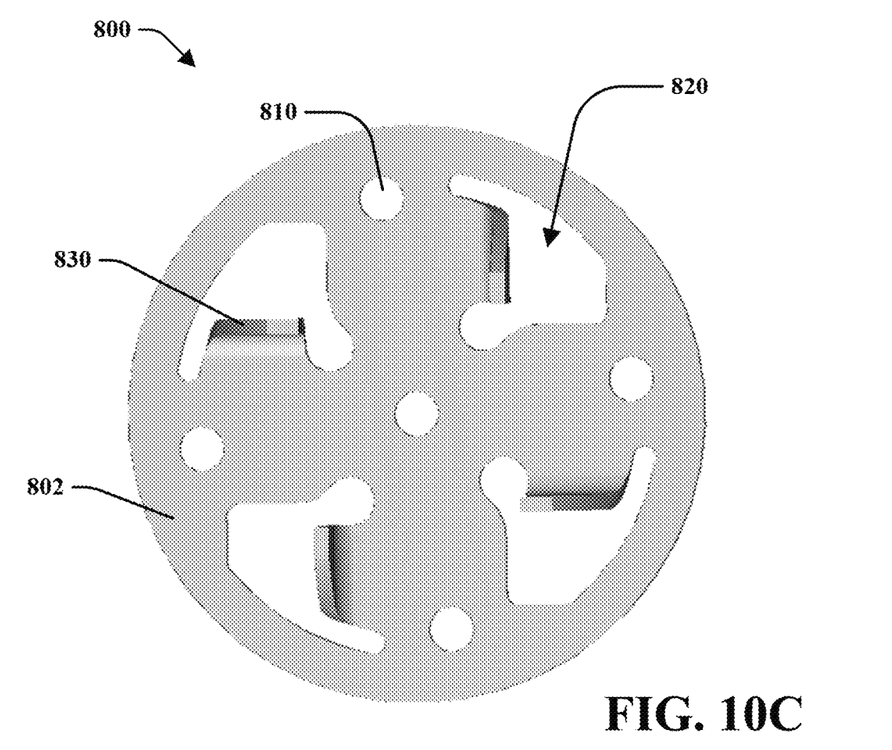
FIG. 10C is a bottom plane view of the whipping blade assembly of FIG. 10A, in accordance with various disclosed aspects.
Figure 10D:
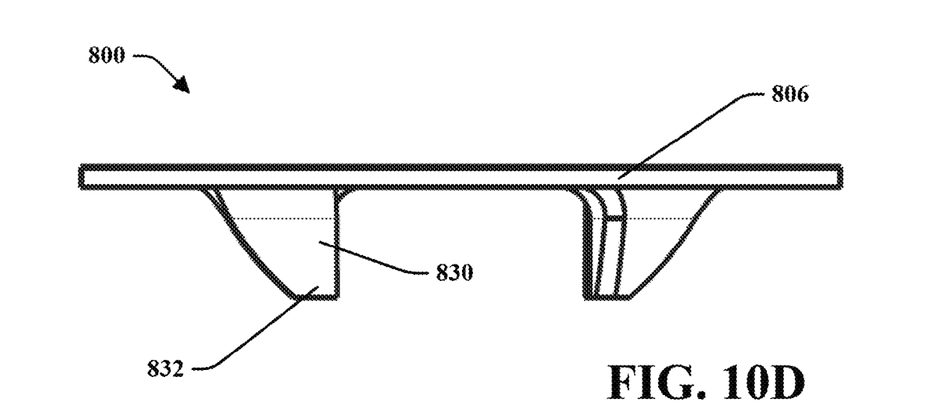
FIG. 10D is a side view of the whipping blade assembly of FIG. 10A, in accordance with various disclosed aspects.
Figure 11A:
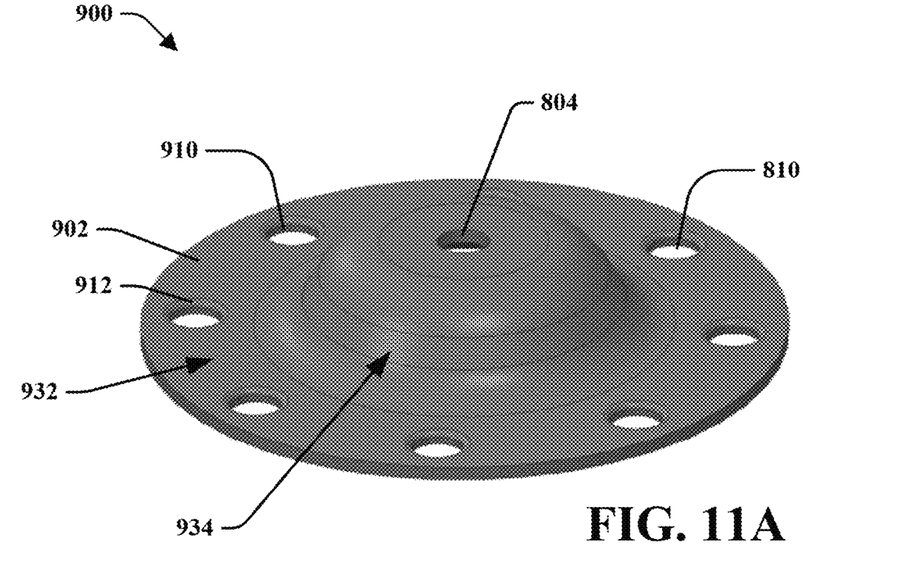
FIG. 11A is a perspective side view of a whipping blade assembly, in accordance with various disclosed aspects.
Figure 11B:
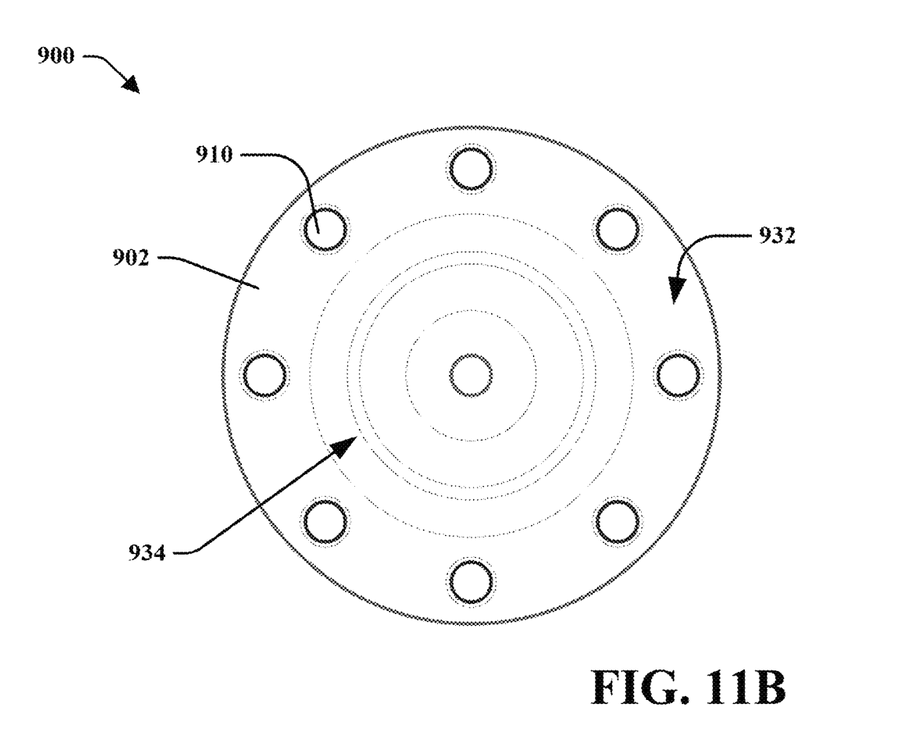
FIG. 11B is a top plane view of the whipping blade assembly of FIG. 10A, in accordance with various disclosed aspects.
Figure 11C:
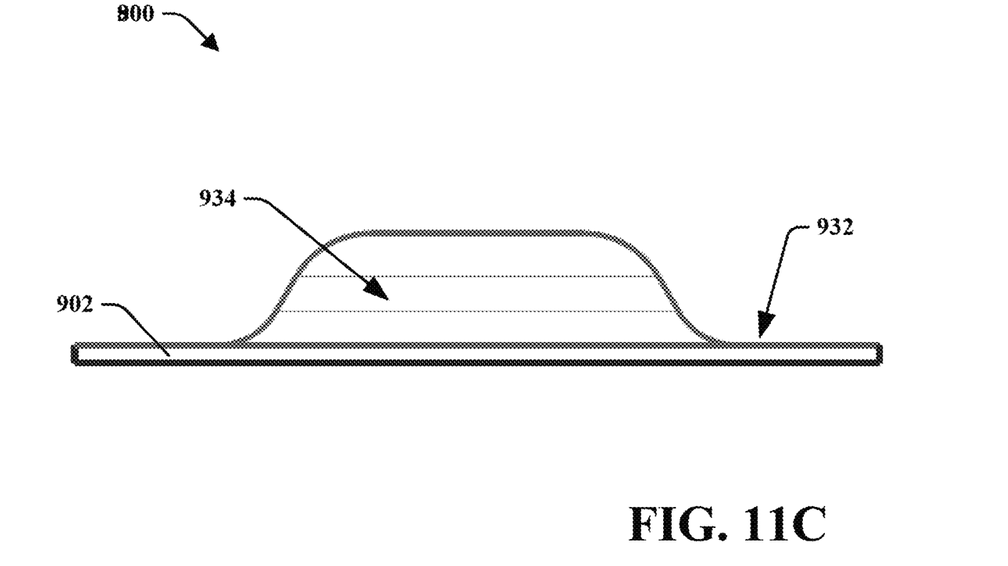
FIG. 11C is a side plane view of the whipping blade assembly of FIG. 10A, in accordance with various disclosed aspects.
Figure 11D:
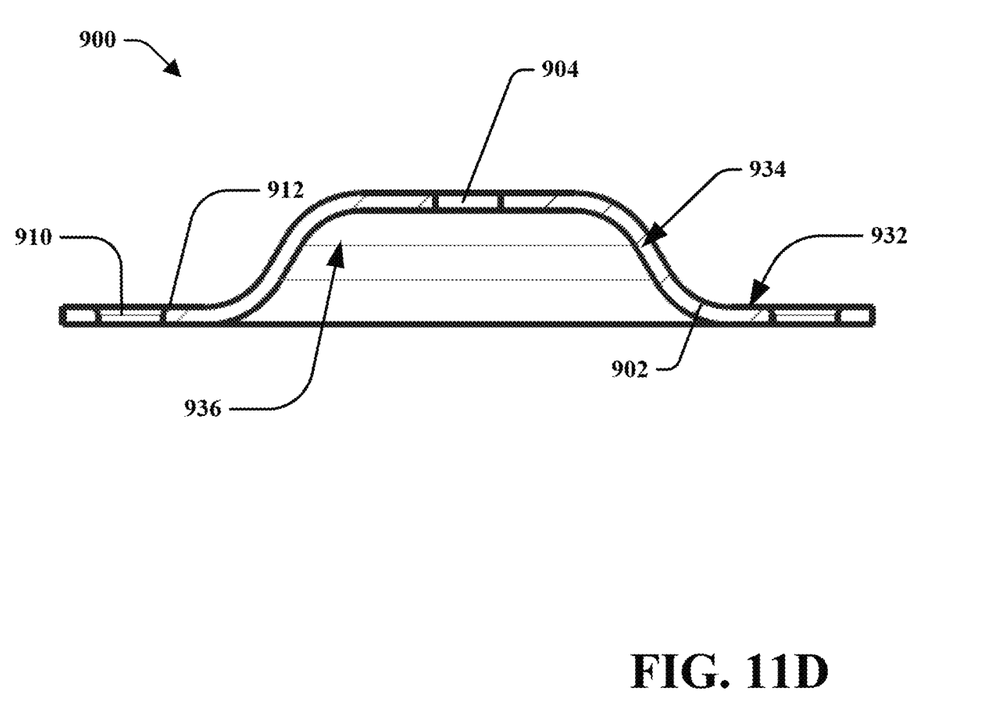
FIG. 11D is a cross-sectional view of the whipping blade assembly of FIG. 10A, in accordance with various disclosed aspects.

FIG. 9 is a whipping blade assembly 700 comprising a convex first side 740 in accordance with various disclosed embodiments. As illustrated, first side 740 may be curved to form a dome-like surface. It is noted that the first side 740 may comprise a surface that is convex, concave, ribbed, wavy, or the like. It is further noted that second side 742 may comprise a flat, convex, concave, ribbed, wavy surface or the like. In various embodiments, the first side 740 and the second side 742 may comprise any combination of surfaces. In at least one embodiment, the surfaces of the first side 740 and the second side 742 may allow for frothing of a liquid without a paddle extending from body 702.

Turning now to FIGS. 10A-D, there is a whipping blade assembly 800 that may be attachable to a blender device (e.g., via shaft attachment member 804, or the like), in accordance with various disclosed aspects. The whipping blade assembly 800 may comprise various aspects as described with reference to the other disclosed drawings. For instance, whipping blade assembly 800 may comprise the same or similar apertures of whipping blade assembly 100, a monolithically formed body 802, or the like. Accordingly, the illustration is one of many embodiments within the scope and spirit of this disclosure.

Whipping blade assembly 800 may generally comprise a body 802 having a perimeter 806 that may be generally circular. As noted herein, the perimeter 806 may be other appropriate shapes. Body 802 may include one or more first apertures 810 formed therethrough. In an aspect, the first apertures 810 may comprise a first set of apertures that may each comprise a first cross-sectional area. Body 800 may, additionally or alternatively, include second apertures 820. The second apertures 820 may each comprise a second cross-sectional area. In an aspect, each of the second apertures 820 may be larger than the first apertures 810. That is, the second cross-sectional area is greater than the first cross-sectional area. While body 802 is described as having first apertures 810 and second apertures 820, it is noted that the various apertures may each be uniquely shaped, and/or body 802 may comprise different or other apertures. For example, body 802 may not include first apertures 810. In another embodiment, each aperture of body 802 may be similar in size and/or shape. Such embodiments are within the scope and spirit of this disclosure. Moreover, while embodiments may refer to first apertures 810 and second apertures 820, it is noted that body 802 may include any number of apertures (e.g., 1, 2, 3, etc.).

Each of the second apertures 820 may comprise a perimeter 822. The perimeter 822 may be various shapes. In an example, the perimeter may define an elongated portion 824 of aperture 820 and a looped portion 826 of aperture 820. In an aspect, the looped portion 826 may be generally circular or elliptical in shape. In another aspect, the looped portion 826 may be proximal the center of whipping blade assembly 800, while elongated portion 824 may be proximal perimeter 806 of whipping blade assembly 800. While described as elongate and looped, the portions 824 and 826 may comprise various shapes. In an aspect, the portions 824 and 826 may be cut away portions of any shape that extend beyond a paddle 830 of the whipping blade assembly 800. It is further noted that second aperture 820 may or may not comprise the cut away portions.

According to at least one embodiment, body 802 may comprise paddles 830 extending therefrom. Paddles 830 may generally extend in a common direction (e.g., generally downwards when viewed in FIG. 10A). Rotation of the whipping blade assembly 800 may cause paddles 830 to agitate ingredients in a blender container. The agitation may force other ingredients to flow through the first apertures 810 and/or second apertures 820. As the ingredients flow through the apertures, they may be imparted with air to whip the ingredients. This may result in a whipped or frothed product.

The paddles 830 may be generally tapered towards a tip 832. In another aspect, the paddles 830 may include a rounded portion 834 that gradually turns the paddle 830 downward. It is noted that other embodiments may include a right or rigid angle instead of rounded portion 834.

FIGS. 11A-D illustrate another whipping blade assembly 900 that may be attached to a drive shaft of a blender via a shaft attachment member 904. As noted above, whipping blade assembly 900 may include similar or different aspects as the other disclosed whipping blade assemblies. For instance, whipping blade assembly 900 may include paddles, elongated apertures, or the like.

Whipping blade assembly 900 includes a body 902 that may be comprise a flattened portion 932 and a convex portion 934. That is, the flat portion 932 may transition towards a center via the raised convex portion 934. It is noted that a bottom side 936 may be hollow, solid, or the like. The shaft attachment member 904 may be disposed in a general center of the convex portion 934 or body 902. In an aspect, the shaft attachment member 904 may include an aperture, threaded aperture, or the like that may allow for operative attachment to a drive shaft of a blender base. According to embodiments, the convex portion 934 may be raised to allow for clearance of a drive shaft, fasteners, and the like. As the convex portion 934 tapers downward, the flat portion 932 may be disposed closer to a bottom of the container. It is noted that body 902 may be generally flat and may not include convex portion 934. In another aspect, the body 902 may comprise a concave portion in addition to or in alternative to the convex portion 934.

In an aspect, body 902 may not include a paddle or other protrusion as described with reference to various other disclosed embodiments. For instance, exclusion of the paddles may allow flat portion 932 to sit lower or closer to a bottom of a container. This allows apertures 910 to be disposed closer to the bottom of the container. Having apertures 910 closer to the bottom of the container may allow the whipping blade assembly 900 to froth smaller amounts of liquid and/or to thoroughly froth liquid. In an example, as a user froths milk with a whipping blade, the contents of the container may alter from liquid to foam. Eventually, the contents may reach a point where little liquid remains. This liquid will naturally gravitate towards the bottom of the container. Having the apertures 910 disposed near the bottom of the container may allow for whipping or frothing of this liquid.

It is noted that the body 902 may include any number of apertures 910. In another aspect apertures 910 may be disposed within convex portion 934. Apertures 910, while depicted as generally normal flat portion 932 and generally cylindrical, may comprise various other shapes and/or may be disposed or formed at angles through the body 902. In another aspect, bottom side 936 may comprise paddles, ridges, whiffles, or other surface formations that may assist in drawing material through apertures 910.

It is noted that apertures 910 may include rounded or tapered edges 912 that may assist in drawing material through the apertures 910. The tapered edges 912 may generally reduce breaking of bubbles in a foam. It is further noted that the curvature of the convex portion 934 may similarly reduce breaking of bubbles in a foam. In other embodiments, the apertures 910 may comprise squared or rigid edges.

Although the present embodiments have been illustrated in the accompanying drawings and described in the foregoing detailed description, it is to be understood that the blending system is not to be limited to just the embodiments disclosed, but that the blending system described herein is capable of numerous rearrangements, modifications and substitutions.

What is claimed is:

1. A blade assembly operatively attached to a blender system, the blade assembly comprising:
    a generally planar body, the body comprising:
        first and second sides;
        a generally cylindrical sidewall perpendicular with the first and second sides;
        a plurality of apertures formed through the body that operatively allows a liquid to pass from the first side of the body to the second side of the body, wherein the plurality of apertures each comprises a first edge and a second edge, and wherein at least one of the first edge or the second edge comprises a tapered portion, wherein the plurality of apertures are arranged in an X-shape on the body; and
    at least one paddle protruding from the second side of the body;
    wherein the at least one aperture froths the liquid.

2. The blade assembly of claim 1, wherein the plurality of apertures each comprises an aperture wall and the at least one paddle comprises a paddle wall, and wherein the aperture wall seamlessly transitions into the paddle wall.

3. The blade assembly of claim 1, wherein the body further comprises an aperture configured to receive a drive shaft.

4. The blade assembly of claim 1, wherein the body represents a disk shape.

5. The blade assembly of claim 1, wherein the at least one paddle comprises a wedge shape.

6. The blade assembly of claim 1, wherein the body comprises a food-grade plastic.

7. The blade assembly of claim 1, wherein the body comprises a plurality of wings.

8. A whipping blade for a blender system, the whipping blade comprises:
    a body comprising a first side, a second side, a cylindrical peripheral edge, and a plurality of apertures formed through the first side to the second side, wherein at least one aperture of the plurality of apertures is disposed proximal a perimeter of the body and comprise a tapered portion proximal to at least one of the first side or second side of the body and wherein the peripheral edge is generally perpendicular with the first and second sides and the plurality of apertures are arranged in an X-shape on the body in line with a central point on the body; and
    wherein the plurality of apertures froth a liquid.

9. The whipping blade of claim 8, wherein the body further comprises a flattened portion and a raised portion.

10. The whipping blade of claim 9, wherein the flattened portion transitions to the raised portion via a curved surface.

11. The whipping blade of claim 9, wherein the flattened portion is closer to a bottom of a blending container than the raised portion when the whipping blade is operatively attached to the blending container.

12. The whipping blade of claim 8, wherein the body further comprises at least one paddle protruding from the body.

13. The whipping blade of claim 8, wherein the body comprises a generally circular shape.

14. The whipping blade of claim 8, wherein the plurality of apertures are disposed generally equal distance from each other and generally about a center of the body.

15. The whipping blade assembly of claim 8, wherein the plurality of apertures are generally normal with a surface of the body.

16. The whipping blade of claim 8, wherein the body is generally solid apart from the apertures and wherein the body has a planar top and bottom.

17. The blade assembly of claim 1 further comprising a plurality of elongated apertures arranged on the body out of line with a central axis of the body.

18. The whipping blade of claim 8 further comprising a plurality of elongated apertures arranged on the body out of line with the central axis of the body.

* * * * *